(12) United States Patent
Han et al.

(10) Patent No.: US 9,374,382 B2
(45) Date of Patent: Jun. 21, 2016

(54) APPARATUS AND METHOD FOR ATTACK SOURCE TRACEBACK

(71) Applicant: ELECTRONICS AND TELECOMMUNICATIONS RESEARCH INSTITUTE, Daejeon (KR)

(72) Inventors: Min-Ho Han, Daejeon (KR); Jung-Tae Kim, Daejeon (KR); Ik-Kyun Kim, Daejeon (KR); Hyun-Sook Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/518,623

(22) Filed: Oct. 20, 2014

(65) Prior Publication Data
US 2015/0150133 A1    May 28, 2015

(30) Foreign Application Priority Data
Nov. 26, 2013    (KR) .................. 10-2013-0144690

(51) Int. Cl.
*G06F 21/55* (2013.01)
*H04L 29/06* (2006.01)
*H04W 12/12* (2009.01)

(52) U.S. Cl.
CPC ........ *H04L 63/1416* (2013.01); *H04L 63/1466* (2013.01); *H04L 63/164* (2013.01)

(58) Field of Classification Search
CPC ................................ H04L 63/14; G06F 21/56
See application file for complete search history.

(56) References Cited

U.S. PATENT DOCUMENTS

| 8,176,173 | B2 * | 5/2012 | Wang | ............... | H04L 63/1425 709/224 |
|---|---|---|---|---|---|
| 2003/0167404 | A1 | 9/2003 | Han et al. | | |
| 2006/0184690 | A1 * | 8/2006 | Milliken | ............ | H04L 63/1466 709/238 |
| 2010/0030891 | A1 * | 2/2010 | Kim | .................... | H04L 63/0281 709/224 |

(Continued)

FOREIGN PATENT DOCUMENTS

| KR | 10-2003-0021338 A | 3/2003 |
|---|---|---|
| KR | 10-0577829 B1 | 5/2006 |
| KR | 10-2009-0113745 A | 11/2009 |
| KR | 10-2013-0049336 A | 5/2013 |

OTHER PUBLICATIONS

Traceback Attacks in Cloud—Pebbletrace Botnet. Lin et al. IEEE(2012).*

(Continued)

*Primary Examiner* — Venkat Perungavoor
(74) *Attorney, Agent, or Firm* — Rabin & Berdo, P.C.

(57) ABSTRACT

An apparatus and a method for an attack source traceback capable of tracing back an attacker, that is, an attack source present behind a command and control (C&C) server in a cyber target attack having non-connectivity over a transmission control protocol (TCP) connection are disclosed. The apparatus for the attack source traceback includes: a server information extracting unit detecting an attack for a system, which is generated via a server to thereby extract information on the server; a traceback agent installing unit installing a traceback agent in the server based on the information on the server; and a traceback unit finding an attack source for the system by analyzing network information of the server obtained by the traceback agent.

10 Claims, 2 Drawing Sheets

(56) References Cited

U.S. PATENT DOCUMENTS

| | | | |
|---|---|---|---|
| 2010/0067377 A1* | 3/2010 | Wang | H04L 63/1441 370/230 |
| 2012/0023572 A1* | 1/2012 | Williams, Jr. | G06F 21/552 726/13 |
| 2013/0031600 A1* | 1/2013 | Luna | G06F 21/554 726/1 |

OTHER PUBLICATIONS

Detecting Distributed Denial of Service Attacks : Methods, Tools, and Future Directions. Bhuyan et al. The Computer Journal(2013).*

Reflector Attack Traceback System with Pushback Based iTrace Mechanism. Lee et al. ICICS(2004).*

* cited by examiner

APPARATUS AND METHOD FOR ATTACK SOURCE TRACEBACK

CROSS REFERENCE TO RELATED APPLICATION

This application claims the benefit of Korean Patent Application No. 10-2013-0144690, filed on Nov. 26, 2013, which is hereby incorporated by reference in its entirety into this application.

BACKGROUND OF THE INVENTION

1. Technical Field

The present invention relates to an apparatus and a method for an attack source traceback. More particularly, the present invention relates to an apparatus and a method for an attack source traceback capable of tracing back an attacker, that is, an attack source which is present behind a command and control (C&C) server in a cyber target attack having non-connectivity over a transmission control protocol (TCP) connection.

2. Description of the Related Art

There are currently positive aspects that an industry structure is reorganized and task efficiency is improved due to quantum leap of Internet technology while there are also negative aspects that cyber terrors such as various crimes, personal attacks, and personal information leakages by abusing anonymity of Internet have occurred.

Of course, in order to solve the problems, various traceback technologies have been discussed. Under an extremely limited environment, it is possible to track a location of a criminal or cracker who is connected using a web of Internet in real time and there was an attempt to trace back a suspect of a web hacking attack in a corresponding construction system.

Further, an attacker (hacker) attempts to attack via a plurality of routes, that is, servers present on a network in order to conceal his/hers location, and various researches that intend to trace back and find an attack source for an attack in the above-mentioned form, that is, the hacker have been currently progressed. However, existing researches may track the attack source only in the case in which connectivity over a TCP connection from the attack source to a damaged system via the route will be maintained, and may not track the attack source any longer in the case in which the attack is performed via a network equipment (e.g., a server, a router, and other security equipment) or an internet service provider (ISP) that does not provide a tracking function.

Therefore, there is a need for an apparatus and a method for an attack source traceback capable of tracing back the attacker, that is, the attack source which is present behind the C&C server in the cyber target attack having non-connectivity over the TCP connection. As the related art, Korean Patent Application Publication No. 10-2003-0021338 has been disclosed.

SUMMARY OF THE INVENTION

Accordingly, the present invention has been made keeping in mind the above problems occurring in the conventional art, and an object of the present invention is to provide an apparatus and a method for an attack source traceback capable of tracing back an attacker, that is, an attack source which is present behind a command and control (C&C) server in a cyber target attack having non-connectivity over a transmission control protocol (TCP) connection.

In addition, another object of the present invention is to provide an apparatus and a method for an attack source traceback capable of analyzing network information on a server obtained from a traceback agent to find an attack source by extracting the information on the server and installing the traceback agent in the server in order to trace back the attacker, that is, the attack source which is present behind the C&C server in the cyber target attack having non-connectivity over the TCP connection.

In accordance with an aspect of the present invention, there is provided an apparatus for an attack source traceback, the apparatus including: a server information extracting unit configured to detect an attack for a system, which is generated via a server to thereby extract information on the server; a traceback agent installing unit configured to install a traceback agent in the server based on the information on the server; and a traceback unit configured to find an attack source for the system by analyzing network information of the server obtained by the traceback agent.

The server may be a command and control (C&C) server.

The information on the server may include an internet protocol (IP) address of the server and system information.

In case of an attack for the system which is generated via a plurality of servers, the traceback agent installing unit may analyze the network information of the server obtained by the traceback agent to thereby sequentially install the traceback agent from a closest server to the system among the plurality of servers.

The traceback unit may find the attack source for the system by sequentially analyzing the network information of the plurality of servers obtained by the traceback agent installed in each of the plurality of servers.

The traceback agent installing unit may install the traceback agent in the server and hide an execution result of the traceback agent so that an attacker does not perceives the installation of the traceback agent.

In accordance with another aspect of the present invention, there is provided a method for an attack source traceback, the method including: detecting, by a server information extracting unit, an attack for a system which is generated via a server to thereby extract information on the server; installing, by a traceback agent installing unit, a traceback agent in the server based on the information on the server; and finding, by a traceback unit, an attack source for the system by analyzing network information of the server obtained by the traceback agent.

The server may be a command and control (C&C) server.

The information on the server may include an internet protocol address of the server and system information.

In the installing of the traceback agent in the server, in case of an attack for the system which is generated via a plurality of servers, the network information of the server obtained by the traceback agent may be analyzed to thereby sequentially install the traceback agent from a closest server to the system among the plurality of servers.

In the finding of the attack source for the system, the attack source for the system may be found by sequentially analyzing the network information of the plurality of servers obtained by the traceback agent installed in each of the plurality of servers.

In the installing of the traceback agent in the server, the traceback agent may be installed in the server and an execution result of the traceback agent may be hidden so that an attacker does not perceive the installation of the traceback agent.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
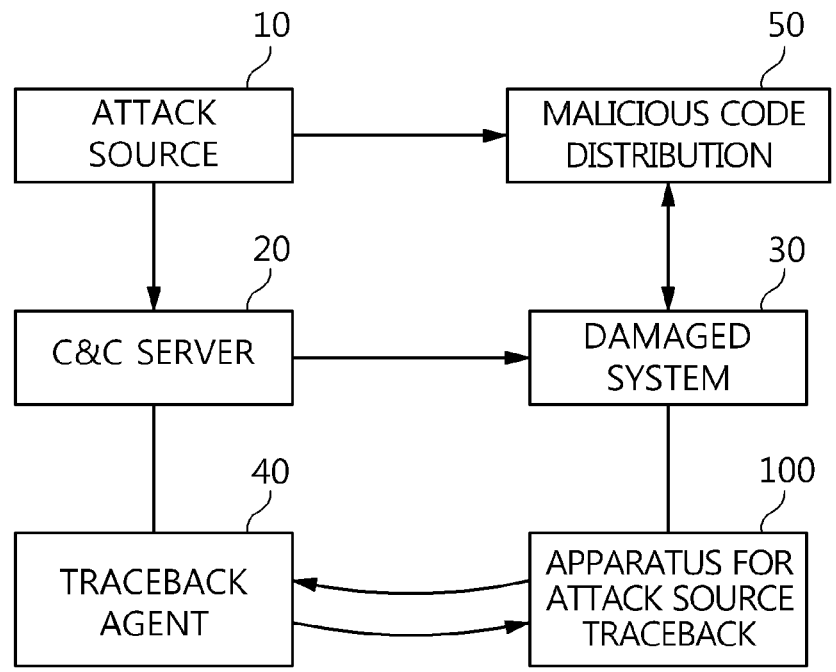
FIG. 1 is a system configuration diagram of an apparatus for an attack source traceback according to the present invention.

The present invention will be described in detail below with reference to the accompanying drawings. Repeated descriptions and descriptions of known functions and configurations which have been deemed to make the gist of the present invention unnecessarily obscure will be omitted below.

The embodiments of the present invention are intended to fully describe the present invention to a person having ordinary knowledge in the art to which the present invention pertains. Accordingly, the shapes, sizes, etc. of components in the drawings may be exaggerated to make the description clearer.

In addition, in describing the components of the present invention, terms such as first, second, A, B, (a), (b), etc. can be used. These terms are used only to differentiate the components from other components. Therefore, the nature, order, sequence, etc. of the corresponding components are not limited by these terms.

Hereinafter, a general concept for a cyber target attack will be described to describe a concept for an apparatus for an attack source traceback according to the present invention.

The cyber target attack is defined as a confidential attack that penetrates a network of a certain company or organization, gains a foothold, and then collects and continuously leaks confidential information, and is progressed for a long time since it confidentially and slowly attacks to avoid a search by a security equipment.

Specifically, the cyber target attack may be divided into an attack preparing step and an attacking step, wherein the attack preparing step is as follows.

1) A process in which an attacker gains an attack route (C&C server) and a malicious code distribution (web or mail server) and installs malicious codes (codes for communication between a damaged system and the C&C server) in the gained malicious code distribution.

2) A process in which the malicious codes are unconsciously downloaded from the web or mail server (malicious code distribution) to which the damaged system is connected.

3) A process in which the malicious codes downloaded to the damaged system are installed and executed to thereby transmit information on the damaged system to the C&C server (attack route).

In addition, the attacking step is referred to as a process in which the attacker leaks and destroys the information of the damaged system which is already gained or the company or organization including the damaged system via the C&C server.

Here, in the attacking step of the cyber target attack, because the attacker uses the C&C server to conceal a his/hers presence (location) and the attacker and the damaged system do not have connectivity over the TCP connection, the damaged system may not trace back the attacker present behind the C&C server even though it detects the attack.

The connectivity over the TCP connection mentioned above is referred to a case in which the attacker directly controls the damaged system via the C&C server as a concept of a proxy server.

In the cyber target attack, the attacker uses a non-connectivity method over the TCP connection in which he/she transmits commands to the C&C server instead of directly controlling the damaged system to allow the C&C server to attack the damaged system and takes information on the damaged system obtained through the attack from the C&C server.

Accordingly, the present invention intends to suggest a solution capable of tracing back the attacker, that is, the attack source which is present behind the C&C server in the cyber target attack having the non-connectivity over the TCP connection that might not been solved by existing technologies.

Hereinafter, an apparatus for an attack source traceback according to an embodiment of the present invention will be described with reference to the accompanying drawings.

Figure 2:
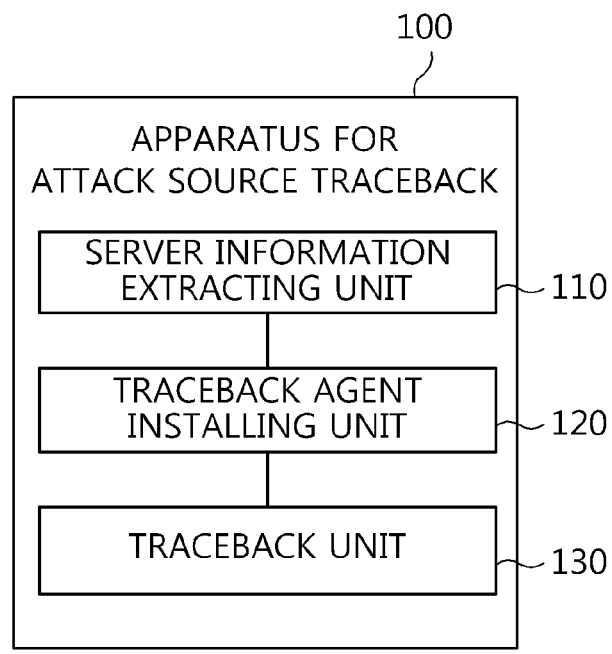
FIG. 2 is a block diagram of the apparatus for the attack source traceback according to the present invention.

FIG. 1 is a system configuration diagram of an apparatus for an attack source traceback according to the present invention. FIG. 2 is a block diagram of the apparatus for the attack source traceback according to the present invention.

Describing in detail the system configuration diagram of the apparatus for the attack source traceback according to the present invention with reference to FIG. 1, it may be seen that an attack source (hacker) 10 attacks a damaged system 30 via a command and control (C&C) server 20.

First, the attack source 10 installs malicious codes (codes for communication between the damaged system 30 and the C&C server 20) in a malicious code distribution 50. Once the damaged system 30 is connected to the malicious code distribution 50, the malicious codes are downloaded on the damaged system 30, such that a route capable of performing communication between the damaged system 30 and the C&C server 20 may be gained.

The apparatus 100 for the attack source traceback according to the present invention detects that the attack source (hacker) 10 attacks the damaged system 30 via the C&C server 20.

As such, after detecting the attack, the apparatus 100 for the attack source traceback according to the present invention extracts information on the C&C server 20 and installs a traceback agent in the C&C server 20 based on the extracted information on the server.

Thereafter, the apparatus 100 for the attack source traceback according to the present invention analyzes network information on the C&C server 20 from the installed traceback agent, thereby making it possible to find the attack source for the damaged system 30.

Describing in detail the respective components of the apparatus for the attack source traceback according to the present invention with reference to FIG. 2, the apparatus 100 for the attack source traceback according to the present invention includes a sever information extracting unit 110, a traceback agent installing unit 120, and a traceback unit 130.

More particularly, the apparatus 100 for the attack source traceback according to the present invention includes the server information extracting unit 110 detecting an attack for a system, which is generated via a server and extracting information on the server, the traceback agent installing unit 120 installing a traceback agent in the server based on the information on the server, and the traceback unit 130 finding the attack source for the system by analyzing the network information of the server obtained by the traceback agent.

The server information extracting unit 110 serves to detect the attack for the system, which is generated via the server and extract the information on the server.

Here, the system refers to a damaged system which is under attack. Specifically, once the attacker attacks the system via the server, the server information extracting unit 110 detects an intrusion and extracts the information on the server through which the attacker passes after detecting the intrusion.

In this case, the server may be a command and control (C&C) server. The C&C server refers to a server serving as a brain of a cyber attack remotely managing zombie PCs and ordering an attack. That is, once the hacker distributes the malicious codes in advance and infects the PC in a 'zombi' state, the PC receives the orders from the C&C server. Therefore, the hacker may remotely control the PC through the C&C server as a his/hers PC.

In addition, the information on the server is a concept including an internet protocol address of the server and system information.

That is, a location of the server may be traced back by extracting the information on the server.

The traceback agent installing unit 120 serves to install the traceback agent in the server based on the information on the server.

As described above, once the information on the server is obtained, the location of the server may be traced back, in which in turn the traceback agent is installed in the server.

Furthermore, the traceback agent installing unit 120 may preferably install the traceback agent in the server so that the attacker does not perceive the installation of the traceback agent. That is, in the case in which the attacker perceives that the traceback agent is installed in the server, because the attacker may not attack any more, it may cause a result incapable of tracing back the location of the attacker.

Therefore, the traceback agent installing unit 120 may install the traceback agent in the server and may hide an execution result of the traceback agent so that the attacker does not perceive the installation of the traceback agent.

Here, in case of the attack for the system, which is generated via a plurality of servers, the traceback agent installing unit 120 may analyze the network information of the server obtained by the traceback agent to thereby sequentially install the traceback agent from a closest server to the system among the plurality of servers.

That is, in the case in which the attacker does not attack the system via one server but attacks the system sequentially via the plurality of servers, the traceback agent installing unit 120 analyzes the network information of the server to thereby sequentially install the traceback agent from a closest server to the system among the plurality of servers.

The traceback unit 130 serves to find the attack source for the system by analyzing the network information of the server obtained by the traceback agent.

Specifically, the traceback unit 130 receives, in real time, the network information of the server from the traceback agent installed in the server by the traceback agent installing unit 120. In this case, the attack source may be found by analyzing the network information of the server which is received in real time.

In addition, in the case in which the attacker attacks the system via the plurality of servers, the traceback unit 130 may find the attack source for the system by sequentially analyzing the network information of the plurality of servers obtained by the traceback agent installed in each of the plurality of servers by the traceback agent installing unit 120.

Hereinafter, a method for an attack source traceback according to an embodiment of the present invention will be described. As described above, a description of technical contents overlapped with the apparatus 100 for the attack source traceback according to the present invention will be omitted.

Figure 3:
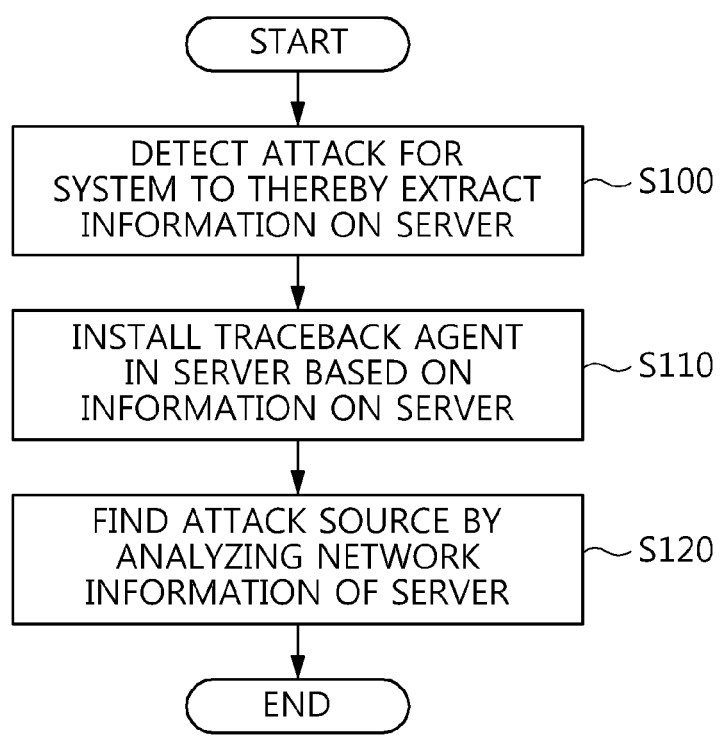
FIG. 3 is a flow chart of a method for an attack source traceback according to the present invention.

FIG. 3 is a flow chart of a method for an attack source traceback according to the present invention.

Referring to FIG. 3, in the method for the attack source traceback according to the present invention, first, the attack for the system, which is generated via a server is detected and information on the server is extracted by a server information extracting unit (S100).

In this case, the server may be a command and control (C&C) server, and the information on the server may include an internet protocol address of the server and system information.

After S100, a traceback agent is installed in the server based on the information on the server by the traceback agent installing unit 120 (S110).

Here, in case of an attack for the system, which is generated via a plurality of servers, in S110, network information of the server obtained by the traceback agent may be analyzed to thereby sequentially install the traceback agent from a closest server to the system among the plurality of servers.

After S110, the attack source for the system is found by analyzing the network information of the server obtained by the traceback agent by the traceback unit.

Here, in S120, in case of the attack for the system, which is generated via the plurality of servers, the attack source for the system is found by sequentially analyzing the network information of the plurality of servers obtained by the traceback agent installed in each of the plurality of servers in S110.

As described above, in the apparatus 100 and the method for the attack source traceback according to the present invention, the information on the server is extracted and the traceback agent is installed in the server in order to trace back the attacker, that is, the attack source which is present behind the C&C server in the cyber target attack having non-connectivity over the TCP connection, such that the network information on the server obtained from the traceback agent may be analyzed to find the attack source.

In accordance with the present invention, the above-mentioned problems may be solved by tracking back the attacker, that is, the attack source which is present behind the C&C server in the cyber target attack having non-connectivity over the TCP connection.

Furthermore, in accordance with the present invention, the information on the server is extracted and the traceback agent is installed in the server in order to trace back the attacker, that is, the attack source which is present behind the C&C server in the cyber target attack having non-connectivity over the TCP connection, such that the network information on the server obtained from the traceback agent may be analyzed to find the attack source.

In the apparatus 100 and the method for the attack source traceback according to the present invention as described above, the configuration and the method of the above-mentioned embodiments are not restrictively applied. That is, all or some of the respective embodiments may be selectively combined with each other so that they may be variously modified.

What is claimed is:

1. An apparatus for an attack source traceback, comprising:
   a server information extracting unit configured to detect an attack for a system, which is generated via a server to thereby extract information on the server;
   a traceback agent installing unit configured to install a traceback agent in a command and control server based on the information on the server; and a traceback unit configured to find an attack source for the system by analyzing network information of the server obtained by the traceback agent, and to sequentially install the traceback agent from a closest server to the system among a plurality of servers in case of an attack for the system which is generated via the plurality of servers, wherein the traceback agent installing unit installs the traceback agent in the command and control server and hides an execution result of the traceback agent so that an attacker does not perceive the installation of the traceback agent.

2. The apparatus of claim 1, wherein the server is a command and control (C&C) server.

3. The apparatus of claim 1, wherein the information on the server includes an internet protocol address of the server and system information.

4. The apparatus of claim 1, wherein the traceback agent installing unit analyzes the network information of the server obtained by the traceback agent.

5. The apparatus of claim 4, wherein the traceback unit finds the attack source for the system by sequentially analyzing the network information of the plurality of servers obtained by the traceback agent installed in each of the plurality of servers.

6. A method for an attack source traceback, comprising:
   detecting, by a server information extracting unit, an attack for a system which is generated via a server to thereby extract information on the server;
   installing, by a traceback agent installing unit, a traceback agent in a command and control server based on the information on the server; and
   finding, by a traceback unit, an attack source for the system by analyzing network information of the server obtained by the traceback agent, and sequentially installing the traceback agent from a closest server to the system among a plurality of servers in case of an attack for the system which is generated via the plurality of servers,
   wherein in the installing of the traceback agent in the server, the traceback agent is installed in the command and control server and an execution result of the traceback agent is hidden so that an attacker does not perceive the installation of the traceback agent.

7. The method of claim 6, wherein the server is a command and control (C&C) server.

8. The method of claim 6, wherein the information on the server includes an internet protocol address of the server and system information.

9. The method of claim 6, wherein in the installing of the traceback agent in the server, in case of an attack for the system which is generated via a plurality of servers, the network information of the server obtained by the traceback agent is analyzed.

10. The method of claim 9, wherein in the finding of the attack source for the system, the attack source for the system is found by sequentially analyzing the network information of the plurality of servers obtained by the traceback agent installed in each of the plurality of servers.

* * * * *